US012611616B2

(12) United States Patent
Nerurkar

(10) Patent No.: US 12,611,616 B2
(45) Date of Patent: Apr. 28, 2026

(54) SYSTEM AND METHOD FOR MANAGING CRYSTALLIZATION PROCESS IN A PROCESS CONTROL PLANT

(71) Applicant: Siemens Aktiengesellschaft, Munich (DE)

(72) Inventor: Harshad Nerurkar, Maharashtra (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1015 days.

(21) Appl. No.: 17/776,613

(22) PCT Filed: Nov. 19, 2019

(86) PCT No.: PCT/EP2019/081829
§ 371 (c)(1),
(2) Date: May 13, 2022

(87) PCT Pub. No.: WO2021/098952
PCT Pub. Date: May 27, 2021

(65) Prior Publication Data
US 2022/0401853 A1 Dec. 22, 2022

(51) Int. Cl.
*B01D 9/00* (2006.01)
*G05B 13/04* (2006.01)
(52) U.S. Cl.
CPC ......... *B01D 9/0063* (2013.01); *G05B 13/041* (2013.01)
(58) Field of Classification Search
CPC ........................... B01D 9/0063; G05B 13/041
See application file for complete search history.

(56) References Cited

U.S. PATENT DOCUMENTS

| | | | |
|---|---|---|---|
| 2009/0204246 | A1 | 8/2009 | Boder |
| 2014/0000586 | A1 | 1/2014 | Mantelatto |
| 2019/0024196 | A1 | 1/2019 | Mahrholz et al. |

FOREIGN PATENT DOCUMENTS

| | | |
|---|---|---|
| DE | 102016101217 A1 | 7/2017 |
| EP | 2 338 579 A1 | 6/2011 |
| JP | 2009102174 A | 5/2009 |
| JP | 2014089549 A | 5/2014 |
| RU | 2342438 C1 | 12/2008 |

OTHER PUBLICATIONS

International Search Report & Written Opinion for PCT/EP2019/081829 issued on Jun. 22, 2020.

(Continued)

*Primary Examiner* — Robert J Eom
(74) *Attorney, Agent, or Firm* — Schmeiser, Olsen & Watts, LLP

(57) ABSTRACT

A method for managing crystallization process in a process control plant is provided. The method includes capturing process parameters of an operating reactor unit in a process control plant. The method includes predicting desired process parameters based on first set of parameters and the captured process parameters. The first set of parameters includes information related to process dynamics and process disturbances associated with the operating reactor unit. Furthermore, the method includes controlling process control loop associated with the operating reactor unit based on the desired process parameters and the first set of parameters.

14 Claims, 8 Drawing Sheets

(56) References Cited

OTHER PUBLICATIONS

Forgione Marco et al: "Batch-to-batch model improvement for cooling crystallization". Control Engineering Practice. Pergamon Press. Oxford, GB, X vol. 41, May 17, 2015 (May 17, 2015), pp. 72-82, XP029225360, ISSN: 0967-0661, DOI: 10.1016/J. CONENGPRAC.2015.04.011 p. 74, left-hand column, line 1-right-hand column, last paragraph.

Zhenguo Gao et al: "Recent Developmentsin the Crystallization Process: Toward the Pharmaceutical Industry". Engineering, vol. 3, No. 3, Jun. 1, 2017 (Jun. 1, 2017). pp. 343-353, XP055688113. ISSN: 2095-8099. DOI: 10.1016/J.ENG.2017.03.022 p. 348, right-hand column, paragraph second-paragraph third.

International Preliminary Report on Patentability for PCT/EP2019/081829 issued on Nov. 4, 2021.

| | | | |
|---|---|---|---|
| 302 | 304 | 306 | 308 |
| 310 | 312 | 314 | 316 |

306

500

SYSTEM AND METHOD FOR MANAGING CRYSTALLIZATION PROCESS IN A PROCESS CONTROL PLANT

CROSS-REFERENCE TO RELATED APPLICATIONS

This application claims priority to PCT Application No. PCT/EP2019/081829, having a filing date of Nov. 19, 2019, the entire contents of which is hereby incorporated by reference.

FIELD OF TECHNOLOGY

The following relates to a field of process control systems, and more particularly relates to system and method for managing crystallization process in process plants.

BACKGROUND

Crystallization is one of a key unit operation in pharmaceutical and chemical industry. Cooling type crystallization is a thermal separation and purification process which yields a solid product from a solution. This solid is pure API crystals. The process of cooling involves use of different utilities for cooling purpose. These utilities are circulated in a jacket/coils of reactor. Some common utilities are hot water, cooling tower water, chilled water and brine. In the process of cooling, it is essential to meet non equilibrium conditions which acts as a driving force for the cooling process. To establish this non equilibrium conditions, evaporation of solvent or temperature reduction (cooling) methods are more frequently employed in the process control industry. The key factors in design of any thermal separation process, such as cooling type crystallization are thermodynamics and kinetics of process control system in process. Thermodynamics of the process control system defines outcomes of the process control system that can be achieved and kinetics of the process control system defines a time scale to achieve such outcomes. This defines and controls crystallization process.

Two processes are important in crystallization, namely process of nucleation and process of crystal growth. Both of these processes are dependent on large number of process parameters that in many cases may be poorly defined. For example, whenever suspensions of crystals in solutions are involved, process parameters such as attrition and agglomeration are considered. These crystals possess an internal structure, external shape and consequently finite size or size distribution in case of quantity of crystals. These parameters define many bulk properties of a given crystalline material such as dissolution rate, bioavailability, color, flow properties etc. A number of factors have to be accounted for when determining solubility of the solvent. First and foremost, it is indeed important to ensure if the solution is in equilibrium condition. At this point, it is important to stress that crystallization is a non-equilibrium process. The value of understanding the equilibrium properties of the solution lies in the fact that they dictate the operating conditions for the crystallization process. The driving force required for nucleation and crystal growth is the level of super saturation in the solution. This means that the crystallization can only occur at solution compositions where the amount of solute exceeds the solubility limit. Such solutions are called super saturated solutions. Also, the region of phase space where supersaturated solution exists is known as metastable zone. To control the nucleation and crystal growth, it is important to operate crystallizer precisely within the metastable zone. The crystal growth rates not only depend upon the temperature, pressure and composition of mother liquor but also on parameters such as super saturation. It is important to control super saturation and one of the important factors that control the super saturation is proper cooling rate. It becomes necessary to control the cooling rate in order to control the rate of nucleation and crystal growth. If the cooling rate is not maintained at the desired value, then there exists below problems:

a. Desired particle size of the crystal cannot be obtained. In case of smaller particles, they pass through filter screens and hence percentage yield is lost.

b. Larger particle size choke the filter screens or adding to milling operation. This consumes longer batch cycle time as well use of additional energy.

c. Polymorphism means unwanted crystal morphs. They have different physical characteristics than desired and affect formulation.

d. Inconsistency in above quality attributed refers to non-compliance to regulatory audits.

Currently crystallizers are operated manually or automated with advanced Proportional, Integral, Derivative (PID) logic. Many times, crystallizers are operated using either single or multi-fluid cooling utilities. The utilities are supplied from common source catering many crystallizer reactors. The capacity of the common source may always not be sufficient to operate all crystallizer reactors at the same time. This leads to occurrence of process complexities such as:

a. Multi-product and multiple reactors with cooling rates are different.

b. Sometimes accurate solubility curve is not known, and hence accurate cooling curve rate in metastable zone is undefined and left to process expert.

c. Desired cooling rate is not achieved due to inaccurate temperature control due to varying process disturbances not anticipated.

d. This results in inaccurate temperature control is due to overshoot and non-stable temperature over set point which disturbs the cooling process. Hence as per the process experience, the utility is switched off before the set point is achieved. Hence slowly temperature is settled down around set point. However, this disturbs cooling curve.

Conventionally, there are certain major process disturbances which are not accounted for during the cooling process. These include:

a. Cooling dynamics changes due to change over of one utility to another. Air purging of cooling jacket is done which upsets cooling rate.

b. Inadequate flow of utility due to inadequate coolant system capacity to cater to multiple reactors.

c. Variation in utility temperature, flow hitting the jacket.

d. Unoptimized utility management.

e. Uneven reactor shell thickness affecting overall heat transfer co-efficient f. Scaling inside jacket or inside reactor g. Hysteresis of final control element h. Change in crystallization mass and thereby changing the heat transfer area, specifically change in properties of crystallization mass;

i. Unaccounted Heat losses;

j. Change of utility disturbs cooling process.

k. Change of heat transfer area due to change in volume for different API batches;

l. Uneven temperature distribution inside crystallization reactor due to temperature gradient as well as due to in-efficient mixing.

All these un-predicted, un-controlled process disturbances are not being taken care either manually, or through a control system, or through a Proportional, Integral, Derivative (PID) logic. This affects the process parameters as mentioned above. Due to above factors, the process parameters influencing the cooling process are compromised resulting in inconsistency, non-regulatory compliance, loss of percentage yield, particle size distribution and crystal morphology. This is a huge process challenge and requires immediate remedy.

In light of the above, there exists a need for providing a method and system for effectively and accurately managing cooling control process in a process industry.

SUMMARY

An aspect relates to a method and system for automatically operating reactor units in a process plant to accurately determine cooling control curve within metastable zone to generate nuclei, control nuclei generation and then nuclei to come together to form crystal with desired morphology.

The aspect of the disclosure is achieved by a method for managing crystallization process in a process control plant. The method comprises capturing process parameters of an operating reactor unit in a process control plant. The process parameters are captured via one or more sensing unit. The process parameters comprises cooling rate, utility management, super saturation, temperature of the operating reactor unit, properties of utilities, parameters related to utility flow management, smart positioner properties, and the like and wherein the utility flow management comprises managing desired utility at desired temperature, at desired time, and at desired flow. The one or more sensing unit comprises one or more temperature sensors external to the operating reactor unit for measuring utility jacket inlet temperature and jacket outlet temperature, one or more temperature sensor deployed internal to the operating reactor unit for measuring crystallization mass temperature, one or more flow meters for measuring utility flow rate, a smart positioner with an automatic control valve for positioning a control element and controlling flow of utility into the operating reactor unit.

Further, the method comprises predicting desired process parameters based on first set of parameters and the captured process parameters. The first set of parameters comprises information related to process dynamics and process disturbances associated with the operating reactor unit. Furthermore, the method comprises controlling process control loop associated with the operating reactor unit based on the desired process parameters and the first set of parameters.

In an embodiment, in predicting the desired process parameters based on the first set of parameters and the captured process parameters, the method comprises computing actual instantaneous cooling rate required for the operating reactor unit based on a second set of parameters associated with the operating reactor unit. Further, the method comprises computing desired cooling rate through utility(s) based on the actual instantaneous cooling rate required and based on a third set of parameters. Also, the method comprises computing desired utility flow for the operating reactor unit based on the computed actual instantaneous cooling rate required, the desired cooling rate, the process dynamics, a Logarithmic Mean Temperature Difference (LMTD) value, a pinch temperature value and Reynold number analysis.

In an embodiment, in computing the actual instantaneous cooling rate required for the operating reactor unit based on the second set of parameters associated with the operating reactor unit, the method comprises determining second set of parameters associated with the operating reactor unit using the one or more sensing unit. The second set of parameters comprises crystallization mass, specific heat of crystallization mass, initial crystallization mass temperature, final crystallization mass temperature, initial batch time, final batch time, instantaneous crystallization mass temperature, instantaneous batch time, and time lapsed versus actual step change time.

In another embodiment, in computing the desired cooling rate through the utility(s) based on the actual instantaneous cooling rate required and based on the third set of parameters, the method comprises determining the third set of parameters associated with the operating reactor unit. The third set of parameters comprises actual flow of utility and specific heat of utility being used in the operating reactor unit.

In another embodiment, the pinch temperature value is computed by generating a pinch curve depicting a temperature difference between instantaneous crystallization mass temperature and utility jacket outlet temperature. Further, the method comprises determining whether the temperature difference is dropped below a predefined threshold value. Also, the method comprises identifying the pinch temperature value corresponding to the determined temperature difference which is dropped below the predefined threshold value.

In yet another embodiment, the logarithmic mean temperature difference value is computed by determining logarithmic mean temperature difference between a) initial crystallization mass temperature and utility jacket outlet temperature, and b) crystallization mass temperature and utility jacket inlet temperature.

In still another embodiment, in predicting the desired process parameters based on the first set of parameters and the captured process parameters, the method comprises determining flow of subsequent utility into the operating reactor unit based on the actual instantaneous cooling rate required when purging is complete, instantaneous crystallization mass temperature and the logarithmic mean temperature difference value.

In an embodiment, in controlling the process control loop associated with the operating reactor unit based on the desired process parameters and the first set of parameters, the method comprises determining actual flow of utility into the operating reactor unit based on the captured process parameters. Further, the method comprises comparing the desired utility flow for the operating reactor unit with the actual flow of utility to determine a utility flow error value. Furthermore, the method comprises controlling the process control loop associated with the operating reactor unit based on the utility flow error value.

In an embodiment, controlling the process control loop associated with the operating reactor unit based on the utility flow error value, the method comprises generating a control signal indicating a change of position of a smart positioner associated with the operating reactor unit based on the utility flow error value. Further, the method comprises determining current position of the smart positioner using the captured process parameters. Further, the method comprises transmitting the generated control signal to the smart positioner via a control system. The method further comprises determining hysteresis value associated with the smart positioner. Also, the method comprises repositioning the smart positioner based on the transmitted control signal, wherein the repositioning of the smart positioner rectifies the utility flow error value to zero value.

In yet another embodiment, in controlling the process control loop associated with the operating reactor unit based on the desired process parameters and the first set of parameters, the method comprises determining loop control mode of selection of a control system. The loop control mode of selection comprises at least one of a Proportional, Integral, Derivative (PID) mode or an advanced cooling control (or auto) mode. Further, the method comprises determining desired cooling rate slope of the operating reactor unit based on pinch temperature and time factor, if the loop control mode of selection is in auto mode. Furthermore, the method comprises comparing the determined desired cooling rate slope with actual cooling rate slope. Also, the method comprises controlling the process control loop associated with the operating reactor unit based on the comparison.

The aspect of the present disclosure is also achieved by a process plant. The process plant comprises one or more operating reactor unit. The one or more operating reactor unit comprises an enclosure capable of yielding a solid product from a solution through a crystallization process. The enclosure comprises a crystallization mass and a mass temperature sensor for measuring temperature of the crystallization mass. Further, the process plant comprises one or more external temperature sensors for measuring utility jacket inlet and outlet temperature and steam inlet temperature. Furthermore, the process plant comprises one or more flow meters for measuring one or more utility flow rate with respect to the one or more operating reactor unit and measuring steam flow rate. Also, the process plant comprises one or more automatic control valves comprising a smart positioner for positioning a control element and controlling flow of utility into the one or more operating reactor unit. Additionally, the process plant comprises a control system coupled to the one or more automatic control valves, one or more flow meters, the mass temperature sensor and the one or more external temperature sensors.

The control system is capable of capturing process parameters of the one or more operating reactor unit. The process parameters are captured via the one or more flow meters, the mass temperature sensor and the one or more external temperature sensors. Further, the control system is capable of predicting desired process parameters based on first set of parameters and the captured process parameters. The first set of parameters comprises information related to process dynamics and process disturbances associated with the one or more operating reactor unit. Furthermore, the control system is capable of controlling process control loop associated with the one or more operating reactor unit based on the desired process parameters and the first set of parameters.

The control system further comprises a control unit for monitoring and controlling the process control loop associated with the one or more operating reactor unit. Also, the control system comprises a remote input/output box for transmitting control signals to the one or more flow meters, the mass temperature sensor and the one or more external temperature sensors.

The control system is further capable of analyzing the first set of parameters comprising information related to process dynamics and process disturbances associated with the one or more operating reactor unit.

The control system is further capable of periodically monitoring the process control loop associated with the one or more operating reactor unit.

The object of the present disclosure is further achieved by a control unit. The control unit comprises a processor and a memory coupled to the processor. The memory comprises a process control module stored in the form of machine-readable instructions and executable by the processor. The process control module is capable of capturing process parameters of an operating reactor unit in a process plant. The process parameters are captured via one or more sensing unit. Further, the process control module is capable of predicting desired process parameters based on first set of parameters and the captured process parameters. The first set of parameters comprises information related to process dynamics and process disturbances associated with the operating reactor unit. The process control module is further capable of controlling process control loop associated with the operating reactor unit based on the desired process parameters and the first set of parameters.

Further, the process control module is capable of storing the captured process parameters, desired critical parameters, first set of parameters, second set of parameters, and third set of parameters.

The above-mentioned and other features of the disclosure will now be addressed with reference to the accompanying drawings of the present disclosure. The illustrated embodiments are intended to illustrate, but not limit the disclosure.

BRIEF DESCRIPTION

Some of the embodiments will be described in detail, with reference to the following figures, wherein like designations denote like members, wherein:

FIG. 3 shows a block diagram of a process control module as shown in FIG. 2, according to an embodiment of the present disclosure.

DETAILED DESCRIPTION

Figure 1:
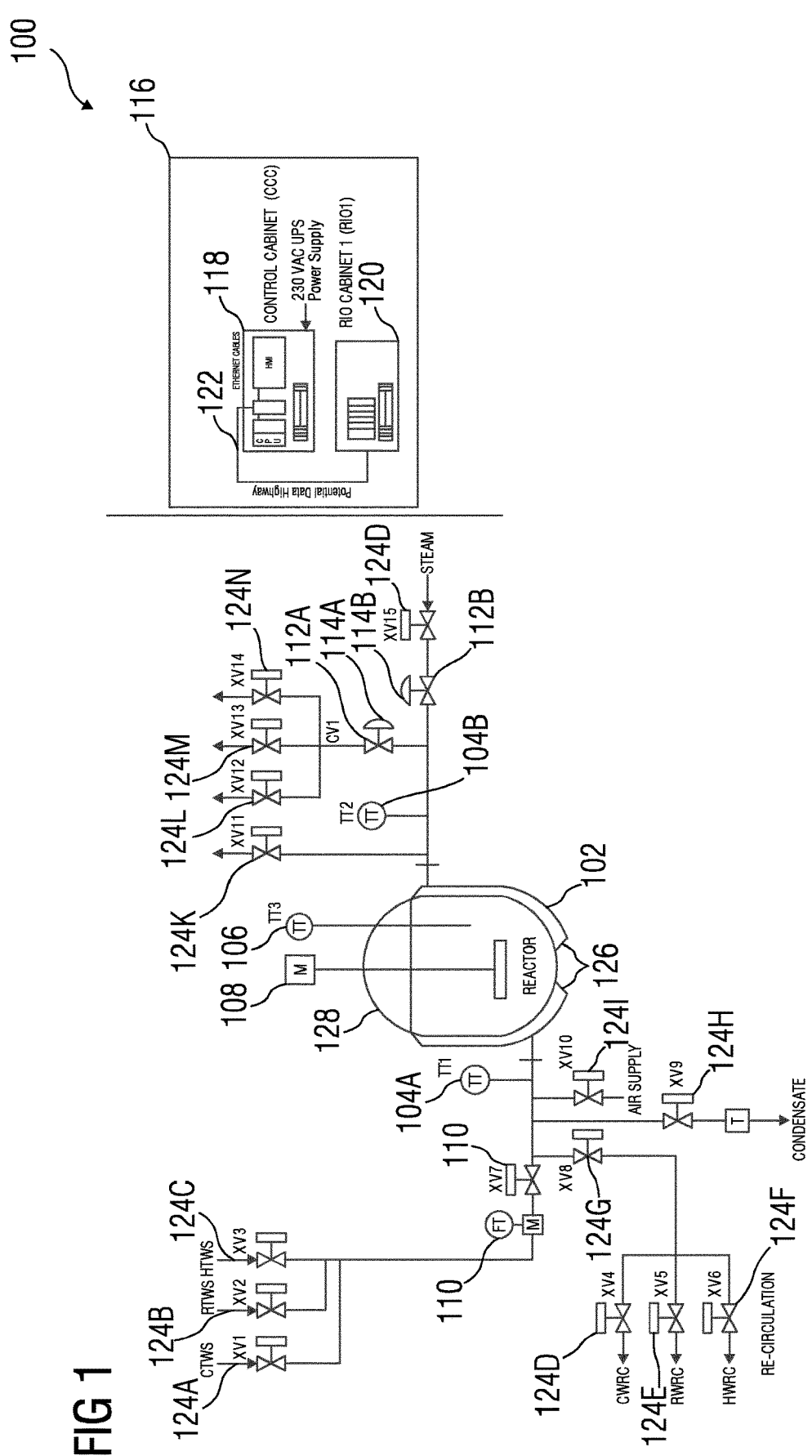
FIG. 1 shows a block diagram of a process control plant, according to an embodiment of the present disclosure.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a block diagram of a process control plant 100 of a process plant, according to an embodiment of the present disclosure. The process control plant 100 comprises operating reactor unit 102 and a control system 116 for operating the operating reactor units 102. The operating reactor unit 102 comprises an enclosure 128 and inlet and outlet jacket 126. The operating reactor unit 102 is a counter current heat exchanger, for example. The enclosure 128 is capable of yielding a solid product from a solution through a crystallization process. The enclosure 128 comprises a crystallization mass 108 and a mass temperature sensor 106. The crystallization mass 108 is a hot fluid. The crystalliza-tion mass temperature can be single or multi-point smart digital RTD temperature sensor 106. The mass temperature sensor 106 is capable of periodically measuring temperature values of the crystallization mass 108, referred as crystalli-zation mass temperature throughout the specification docu-ment. The mass temperature sensor 106 is also capable of transmitting the measured temperature values of the crys-tallization mass 108 to the control system 116. The inlet and outlet jacket 126 carry a utility, which may be a cold fluid.

The process control plant 100 further comprises one or more external temperature sensors 104A-B for measuring utility jacket inlet 126A temperature and utility jacket outlet temperature 126B and steam inlet temperature. The external temperature sensors 104A-B periodically measures and pro-vides temperature inputs to the control system 116 during operation of the operating reactor unit 102.

The process control plant 100 further comprises one or more flow meters 110 for measuring one or more utility flow rate with respect to the one or more operating reactor unit 102 and measuring steam flow rate. The one or more flow meters 110 may be an electromagnet flow meter. The one or more flow meters 110 is capable for capturing utility man-agement, properties of utilities, and parameters related to utility flow management. The utility flow management com-prises managing desired utility at desired temperature, at desired time, and at desired flow. Specifically, utility flow management refers to selection of right utility temperature at right time with desired flow. This is based upon identifying a pinch temperature. This is achieved, firstly, when the reactors units 102 are designed, pinch temperature value is defined for a given cooling surface area (A) and overall heat transfer coefficient (U). This pinch temperature value is monitored and when the pinch temperature value is met with 80% of final control element opening, then the automatic control valves 112A-B with smart positioners 114A-B are repositioned such as to switch over to next utility. With this, the cooling efficiency of the operating reactor unit 102 may also be monitored. With increase in the pinch temperature value, the efficiency deteriorates. The reason could be scal-ing or fouling. This could be tracked efficiently. Further, temperature of utility is controlled by ratio controller by mixing hot and cold fluid. The properties of utilities com-prise heat balance during supply of utility, changeover with air purging and admitting new utility.

Further, the process control plant 100 comprises one or more automatic control valves 112A-B comprising a smart positioner 114A-B for positioning a control element and controlling flow of utility into the one or more operating reactor unit 102. The automatic control valve 112A-B is provided for controlling outflow of utilities (e.g.) from the operating reactor unit 102. The automatic control valve 112A-B e.g. pneumatically actuated full bore ball valve.

Further, the process control plant 100 also comprises on-off valves 124A-N for air supply, jacket inlet, jacket recirculation, isolation of magnetic flow meter, steam con-densate, vent, jacket outlet, steam isolation and the like.

The control system 116 is coupled to the one or more automatic control valves 112A-B, one or more flow meters 110, the mass temperature sensor 106 and the one or more external temperature sensors 104A-B. the control system 116 is capable of managing the crystallization process in the process control plant 100. The control system 116 is capable of capturing process parameters of the one or more operating reactor unit 102. The process parameters are captured via the one or more flow meters 110, the mass temperature sensor 106 and the one or more external temperature sensors 104A-B. The process parameters comprises cooling rate, utility management, super saturation, temperature of the operating reactor unit 102, properties of utilities, parameters related to utility flow management, smart positioner prop-erties, and the like and wherein the utility flow management comprises managing desired utility at desired temperature, at desired time, and at desired flow. Further, the control system 116 is capable of predicting desired process param-eters based on first set of parameters and the captured process parameters. The first set of parameters comprises information related to process dynamics and process distur-bances associated with the one or more operating reactor unit 102. Furthermore, the control system 116 is capable of controlling process control loop associated with the one or more Operating reactor unit 102 based on the desired process parameters and the first set of parameters.

Figure 2:
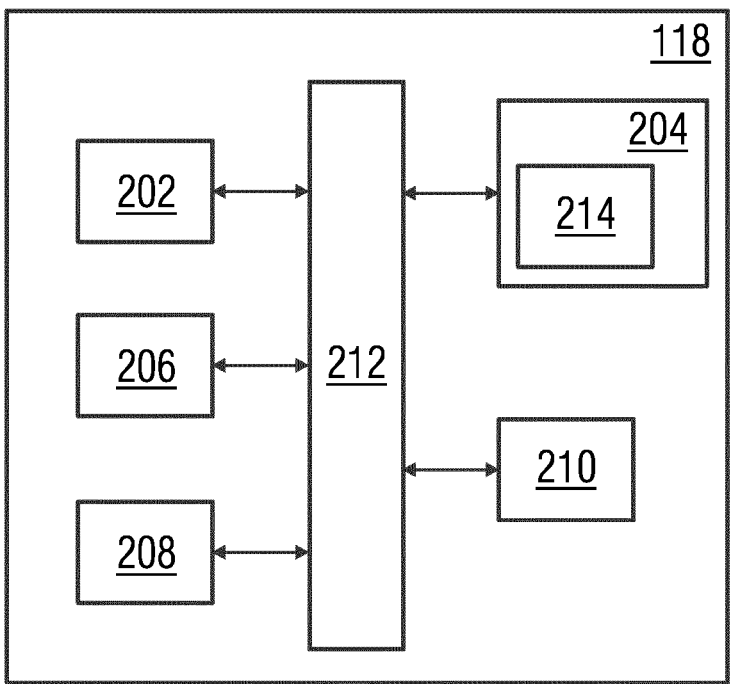
FIG. 2 shows a block diagram of a control unit as shown in FIG. 1, according to an embodiment of the present disclosure.

The control system 116 comprises a control unit 118 for monitoring and controlling the process control loop associ-ated with the one or more operating reactor unit 102. The control unit 118 further comprises a process control module stored in the form of machine-readable instructions and executable by the processor. One can envision that the process control module may reside in an industrial cloud environment, wherein the control system 116 may provide the inputs from the one or more sensing unit 104A-B, 106, 110 and receive control signals for operating the reactor units 102 from a cloud server in the industrial cloud envi-ronment. The detailed components of the control unit 118 is depicted in FIG. 2. In an embodiment, the control unit 118 may include human machine interface, a control unit and the like.

The control system 116 further comprises a remote input/ output box 120 for transmitting control signals to the one or more flow meters 110, the mass temperature sensor 106 and the one or more external temperature sensors 104A-B. The remote input/output box 120 may be connected to the control unit 118 via a network 122. Such network 122 may include Ethernet connection. In an embodiment, the control system 116 is capable of analyzing the first set of parameters comprising information related to process dynamics and process disturbances associated with the one or more oper-ating reactor unit 102. Further, the control system 116 is capable of periodically monitoring the process control loop associated with the one or more operating reactor unit 102. In the process control plant 100, the control system 116 is located in a safe area or in the same hazardous zone where the operating reactor unit 102 are located.

In an exemplary operation, the operating reactor unit 102 is used for cooling the crystallization mass 108 from utility which are fed in the enclosure 128. Once batch cycle is started, the process parameters are periodically captured and monitored by the control system 116. Once, there is a deviation observed in the actual process parameters which are captured and desired process parameters, then appropriate control signals are generated and transmitted in a desired sequence to the flow meters 110, automatic control valves 112A-B, the smart positioners 114A-B and the on-off valves 124A-B to control the process control loop and ensure smooth phase of crystallization process at the operating reactor unit 102. During generation of control signals, various other parameters such as first set of parameters, second set of parameters and third set of parameters are considered to attain better control the rate of nucleation and crystal growth in crystallization process.

In various embodiments, the process control plant 100 can be part of a distributed control system employed in a process plant. The process control plant 100 can be used for different combination of utilities and crystallization mass 108 for different volumes at different times without performing re-calibration. Thus, same operating reactor unit 102 can be used for multiple batches. Also, the process control plant 100 can seamlessly operate one or more operating reactor units using a single control system. Additionally, the process control plant 100 improves heat balance during supply of utility, changeover with air purging and admitting new utility. Advanced temperature control help to operate reactor unit 102 in narrow metastable zone. This means controlled nucleation begins, and also the polymorphs are avoided. Also, the process control plant 100 can operate in co-ordination with existing PID controller to provide better rate of cooling control thereby providing measurable improvement in process parameters. This further results in reduced batch time as no additional milling operation is required. Further, the process control plant 100 ensures consistent process point and reduced human intervention ensuring safe operation of the process control plant 100.

Further, as solid (for e.g., crystallization mass 108) is precipitating out, energy is released to surrounding environment. Hence, crystallization is exothermic process. If the nucleation rate of the crystallization mass 108 increases, more amount energy is released. This raises the temperature of crystallization mass 108. This means cooling rate needs to be decreased. The process control plant 100 considers measuring temperature of crystallization mass 108, jacket inlet and outlet temperatures of utilities at a time frequency pre-determined, settable. This ensures the cooling rate is adopted as per the process demand. This also ensures the nucleation is controlled in a better way. The process control plant 100 is thus predictive by using knowledge of chemistry, physics and automation. Hence, the process control plant 100 monitors, analyzes and controls the crystallization process such that chances for occurrence if any error or faults are decreased. Moreover, the process control plant 100 allows the control system 116 to decides action for utility requirement for heating and cooling. The control system 116 decides when to use traditional PID controller mode and when to use auto mode.

Although FIG. 1 illustrates the process control plant 100 with a single operating reactor unit 102 connected to the control system 116, one can envision that multiple such operating reactor units can be coupled to the control system 116 and a process control plant 100 via the Input/output modules 120, and the control system 116 can operate multiple such reactor units simultaneously.

FIG. 2 is a block diagram of a control unit 118 as shown in FIG. 1, according to an embodiment of the present disclosure. The control unit (CCC) 118 comprises a processor 202, a memory 204, a communication module 206, a network interface 208, an input/output module 210 and a bus 212. The CCC 118 is capable of monitoring and controlling the crystallization process in the process control plant 100. Specifically, the CCC 118 is capable of predicting desired process parameters based on first set of parameters and the captured process parameters and controlling process control loop associated with the operating reactor unit 102 based on the desired process parameters and the first set of parameters.

The processor 202, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 202 may also include embedded controllers, such as generic or programmable logic devices or arrays, application specific integrated circuits, single-chip computers, and the like.

The memory 204 may be volatile memory and non-volatile memory. A variety of computer-readable storage media may be stored in and accessed from the memory 204. The memory 204 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. As depicted, the memory 204 includes a process control module 214. The process control module 214 is stored in the form of machine-readable instructions on any of the above-mentioned storage media and may be executed by the processor 202. When executed by the processor 202, the process control module 214 is capable of capturing process parameters of the operating reactor unit 102 in the process plant 100. The process parameters are captured via the one or more sensing unit 104A-B, 106, 110. The process control module 214 is further capable of predicting desired process parameters based on first set of parameters and the captured process parameters. The first set of parameters comprises information related to process dynamics and process disturbances associated with the operating reactor unit 102. Furthermore, the process control module 214 is capable of controlling process control loop associated with the operating reactor unit 102 based on the desired process parameters and the first set of parameters.

The communication module 206 may enable communication of the CCC 118 with the one or more sensing unit 104A-B, 106, 110, and the one or more automatic control valves 112A-N and the operating reactor unit 102 via input/output modules 120. For example, the communication module 206 may periodically receive inputs from the one or more sensing unit 104A-B, 106, 110. The inputs may indicate process parameters. Also, the inputs may indicate whether the crystallization process is in control or not. The communication module 206 may enable transmit control signals to the automatic control valves 112A-B for operating the automatic control valves 112A-B.

The network interface 208 helps in managing network communications between the CCC 118 and the one or more sensing unit 104A-B, 106, 110, the one or more automatic control valves 112A-B, and the operating reactor unit 102.

The input/output unit 210 may be a human-machine interface Which enables operator to view process data associated with the operating reactor unit 102 and control process associated with the operating reactor unit 102. It can be noted that, the CCC 118 may have integrated human-machine interface or a human-machine interface externally coupled to the CCC 118.

FIG. 3 is a block diagram of a process control module 214 as shown in FIG. 2, according to an embodiment of the present disclosure. In FIG. 3, the process control module 214 comprises data receiver module 302, data analyzer module 304, process parameter prediction module 306, controlling module 308, mode selection module 310, crystallization process monitoring module 312, a database 314, and a data visualizer 316.

The data receiver module 302 is configured for capturing process parameters of an operating reactor unit 102 in the process plant 100. The process parameters are captured via one or more sensing unit 104A-B, 106, 110. The process parameters comprise cooling rate, utility management, super saturation, temperature of the operating reactor unit, properties of utilities, parameters related to utility flow management, smart positioner properties, and the like. The utility flow management comprises managing desired utility at desired temperature, at desired time, and at desired flow. The one or more sensing unit 104A-B, 106, 110 comprises one or more temperature sensors 104A-B external to the operating reactor unit 102 for measuring utility jacket inlet 126A temperature and jacket outlet 126B temperature, one or more temperature sensor 106 deployed internal to the operating reactor unit 102 for measuring crystallization mass temperature, one or more flow meters 110 for measuring utility flow rate, a smart positioner 114A-B with an automatic control valve 112A-B for positioning a control element and controlling flow of utility into the operating reactor unit 102.

In an embodiment, the one or more sensing unit 104A-B, 106, 110 captures the process parameters and transmits the process parameters to the data receiver module 302. The data receiver module 302 receives the process parameters and parses the process parameters for data integrity. Further, the data receiver module 302 may capture any other data relevant to any hardware component involved in the crystallization process.

The data analyzer module 304 is configured for analyzing first set of parameters comprising information related to process dynamics and process disturbances associated with the one or more operating reactor unit 102. In an embodiment, the information related to the process dynamics comprises of crystallization mass properties like actual mass, specific heat, reactor properties like volume, surface area, co-efficient heat transfer, instantaneous temperatures, utility properties like specific heat capacity, temperature, solubility curve, desired cooling rate, instantaneous cooling rate, Reynold's number, pinch analysis, valve position feedback. Further, the information related to the process disturbances comprises a) Cooling dynamics changes due to change over of one utility to another, b) Air purging of cooling jacket is done which upsets cooling rate, c) Inadequate flow of utility due to inadequate coolant system capacity, c) Variation in utility temperature hitting the jacket, d) Unoptimized utility management e) Uneven reactor shell thickness affecting overall heat transfer co-efficient, f) Scaling inside jacket or inside reactor, g) Hysteresis of final control element, h) Change in crystallization mass (108), i) Change in properties of crystallization mass (108), j) Unaccounted Heat losses, k) Change of utility disturbs cooling process, l) Change of heat transfer area due to change in volume for different API batches, m) Uneven temperature distribution inside crystallization reactor due to temperature gradient.

The data analyzer module 304 is further configured for determining second set of parameters associated with the operating reactor unit 102 using the one or more sensing unit 104A-B, 106, 110. The second set of parameters comprises crystallization mass 108, specific heat of crystallization mass 108, initial crystallization mass temperature, final crystallization mass temperature, initial batch time, final batch time, instantaneous crystallization mass temperature, instantaneous batch time, and time lapsed versus actual step change time.

The data analyzer module 304 is configured for determining the third set of parameters associated with the operating reactor unit 102. The third set of parameters comprises actual flow of utility and specific heat of utility being used in the operating reactor unit 102.

The process parameter prediction module 306 is configured for predicting the desired process parameters based on the first set of parameters and the captured process parameters.

The process parameter prediction module 306 is configured for determining flow of subsequent utility into the operating reactor unit 102 based on the actual instantaneous cooling rate required when purging is complete, instantaneous crystallization mass temperature and the logarithmic mean temperature difference value. The process parameter prediction module 306 ensures that next utility or subsequent utility is admitted into the jacket 126 of the operating reactor unit 102 only temperature wise due avoid thermal shock.

Figure 4:
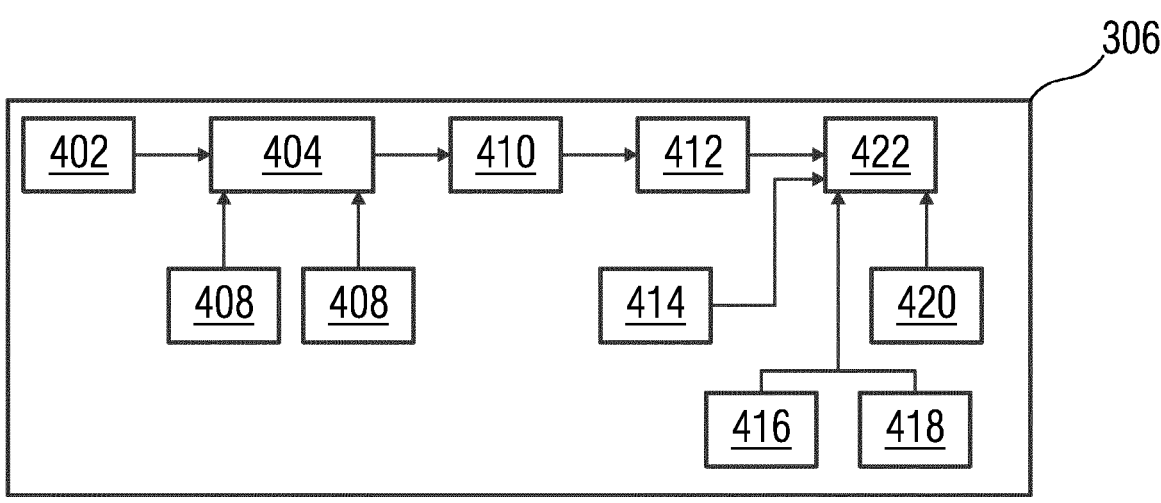
FIG. 4 shows a block diagram of a process parameter prediction module as shown in FIG. 3, according to an embodiment of the present disclosure.

The detailed steps of predicting the desired process parameters are provided in FIG. 4.

The controlling module 308 is configured for controlling process control loop associated with the operating reactor unit 102 based on the desired process parameters and the first set of parameters. Specifically, the controlling module 308 is configured for first determining actual flow of utility into the operating reactor unit 102 based on the captured process parameters. The actual flow of utility refers to amount of desired utility hitting the jacket of a reactor. Later, the controlling module 308 is configured for comparing the desired utility flow for the operating reactor unit 102 with the actual flow of utility to determine a utility flow error value. The utility flow error value indicates an anomalous process condition of the utility flow into the operating reactor unit 102. Based on the utility flow error value, the controlling module 308 is configured for controlling the process control loop associated with the operating reactor unit 102. For example, if the utility flow error value is above a predefined threshold, then the flow of utility is immediately stopped. This is achieved as below.

The controlling module 308 is further configured for generating a control signal indicating a change of position of a smart positioner 114A-B associated with the operating reactor unit 102 based on the utility flow error value. For example, if the utility flow error value is above the threshold, then a control signal indicating a change in position of smart positioner 114A-B, for example a position which stops the flow of the utility, is generated. Further, the controlling module 308 is configured for determining current position of the smart positioner 114A-B using the captured process parameters. The current position of the smart positioner 114A-B is for the current cooling rate. Further, the controlling module 308 is configured for transmitting the generated control signal to the smart positioner 114A-B via a control system 116. The generated control signal may be transmitted via a communication network, for example port communication. Furthermore, the controlling module 308 is configured for determining hysteresis value associated with the smart positioner 114A-B. The hysteresis value is difference in position of control valve between desired and actual after signal is given to positioner. Hysteresis can be due to improper torque applied on gland packing. Further, the controlling module 308 is configured for repositioning the smart positioner 114A-B based on the transmitted control signal. The repositioning of the smart positioner 114A-B rectifies the utility flow error value to zero value. This indicates that the utility flow is controlled preventively to ensure smooth performance of the operating reactor unit 102 and increased productivity of the process control plant 100. Also, this helps to overcome errors arising due hysteresis because of improper packing gland torque. The repositioned smart positioner 114A-B may be at a position which stops the flow of the utility. In an exemplary embodiment, a polygon table is inserted as per the final control element flow curve (supplied by final control element manufacturer—11 points minimum to have more accuracy) to determine the position of the smart positioner 114A-B. There is possibility that control element do not attain the desired position due to hysteresis arising from torque applied on packing glands. The smart positioner 114A-B by giving feedback helps correcting the position thereby reducing the utility flow error value.

The controlling module 308 is configured for determining desired cooling rate slope of the operating reactor unit 102 based on pinch temperature and time factor, if the loop control mode of selection is in auto mode. Specifically, at pinch temperature, it is determined whether the actual flow of utility meets the maximum flow capacity of the final control element (also referred as the automatic control valve 112A-B). The details of mode selection are explained with respect to mode selection module 310. The controlling module 308 is configured for comparing the determined desired cooling rate slope with actual cooling rate slope and controlling the process control loop associated with the operating reactor unit 102 based on the comparison. In an embodiment, if the actual flow of utility has reached 80% of maximum flow capacity of final control element, then the controlling module 308 controls the process control loop by switching off the utility, flush the operating reactor unit and inlet jacket 126A and outlet jacket 126B with air and switch over to the next utility. If the actual flow of utility and the maximum flow capacity of final control element are not equal then, in this case, the actual cooling rate slope starts deviating. The desired cooling rate slope (dT/dtreqd) is then monitored against actual cooling rate slope (dT/dtinsa). If the deviation is outside defined bracket, then the first measure is to throttle final control element to open till it reaches to maximum flow capacity.

For example, if the actual cooling rate slope does not match with the desired cooling rate slope, then either utility flow is adjusted considering actual utility properties or changing utility. Further, the desired cooling rate slope effects super saturation of the crystallization process.

The mode selection module 310 is configured for determining loop control mode of selection of a control system 116. The loop control mode of selection comprises at least one of a manual mode or an auto mode. The manual mode includes either PID mode or Intel mode. The auto mode is the mode through the which the disclosure achieves the objective. The auto mode will help the control system 116 to select best suited mode for temperature control. In Intel mode, the first option is using PID logic. Later, the desired cooling rate slope is tracked (dT/dtreqd) with respect to actual cooling rate slope (CCact). The actual cooling rate slope is temperature against time factor. In order to track the desired cooling rate slope, first the pinch temperature of the crystallization process is determined. Later, it is determined whether the utility flow is at maximum. If it is determined that the utility flow is not at the maximum value, then the utility flow is increased to 80%. Further, it is monitored whether a deviation still persists in the actual cooling rate slope. If yes, then the mode of selection is changed to advanced cooling control mode (or auto mode).

Upon changing the mode of selection to advanced cooling control mode, both cooling slope, i.e., desired cooling rate slope and actual cooling rate slope is stabilized with respect to time defined Window. The remaining batch of the crystallization process is run with advanced cooling control mode.

The crystallization process monitoring module 312 is configured for monitoring the process control loop associated with the one or more operating reactor unit 102. The crystallization process monitoring module 312 is configured for tracking constantly the crystallization process with respect to the process dynamics, process disturbances, utility properties, process parameters, first set of parameters, second set of parameters and the third set of parameters. During monitoring, the crystallization process monitoring module 312 identifies even if there is a slight deviation in any of these data and reports to the process parameter prediction module 306 and the data analyzer module 304. Since process dynamics information such as enthalpy change due to heat transfer is constantly monitored, the corrective actions are determined and implemented much before any anomalies affects the temperature.

The database 314 is configured for storing the captured process parameters, desired process parameters, first set of parameters, second set of parameters, and third set of parameters. The captured process parameters, desired process parameters, first set of parameters, second set of parameters, and third set of parameters are stored may be in a form of a lookup table and in a specific format. In an embodiment, the database 314 may comprise a relational database (RDBMS), file system and not only SQL (NoSQL) database. The database 314 are encrypted to secure all data stored. In an embodiment, the database 314 stores all the data during an intermittent network connectivity. This data is then made available to the control system 116 once the network connectivity is active.

The data visualizer 316 is configured to output the desired process parameters. The data visualizer 316 is also configured for visualizing the process trends of the crystallization process across all stages. For example, the visualization may include anomalies detected, live process data, pinch analysis, Reynold analysis, and the like.

FIG. 4 is a block diagram of a process parameter prediction module 306 as shown in FIG. 3, according to an embodiment of the present disclosure. The process parameter prediction module 306 comprises a timer 402, an actual instantaneous cooling rate required calculator 404, a step counter 406, a valve position feeder 408, a desired cooling rate through utility(s) calculator 410, cooling rate determiner 412, a parameters handler module 414, a pinch analysis module 416, a Reynold number analysis module 418, a logarithmic mean temperature difference value generator module 420, and a desired utility flow F$_r$ generator 422.

The timer 402 is configured for generating time series data for the process control loop associated with the operating reactor unit 102. This time series data is fed as an input to an actual instantaneous cooling rate required calculator 404.

The actual instantaneous cooling rate required calculator 404 is configured for computing actual instantaneous cooling rate required (Q1) for the operating reactor unit 102 based on a second set of parameters associated with the operating reactor unit 102. The actual instantaneous cooling rate required (Q1) is equivalent to amount of heat to be withdrawn from crystallization mass considering instantaneous temperature of crystallization mass and heat of crystallization generated. The second set of parameters may be stored in the database 314. The second set of parameters comprises crystallization mass 108, specific heat of crystallization mass 108, initial crystallization mass temperature, final crystallization mass temperature, initial batch time, final batch time, instantaneous crystallization mass temperature, instantaneous batch time, and time lapsed versus actual step change time. In an embodiment, the crystallization mass 108 is a hot fluid. The specific heat of crystallization mass 108 is the heat required to raise or reduce temperature of unit mass by given amount. The initial crystallization mass temperature is instantaneous temperature at start of crystallization process. Any loss of heat to environment will affect the instantaneous crystallization mass temperature (Tinsta).

The actual instantaneous cooling rate required calculator 404 receives inputs from the timer 402, a step counter 406, and a valve position feeder 408. The step counter 406 provides a pre-defined time interval for instantaneous temperature measurement, calculating instantaneous cooling rate. The valve position feeder 408 provides current position of the automatic control valves 112A-B and the smart positioner 114A-B to the actual instantaneous cooling rate required calculator 404. The actual instantaneous cooling rate required calculator 404 computes the actual instantaneous cooling rate required (Q1) for the operating reactor unit 102 based on the second set of parameters, data from the timer 402, data from the valve position feeder 408 and data from the step counter 406. The actual instantaneous cooling rate required (Q1) is then fed to desired cooling rate through utility(s) calculator 410 as an input. The cooling rate induced at any given instance is calculated dynamically by measuring instantaneous crystallization mass temperature (Tinsta) and using a time lapsed (tinsta) vs. actual step change time (tn) and LMTD.

The desired cooling rate through utility(s) calculator 410 is configured for computing desired cooling rate through utility(s) (Q2) based on the actual instantaneous cooling rate required and based on a third set of parameters. The third set of parameters comprises actual flow of utility and specific heat of utility being used in the operating reactor unit 102. The desired cooling rate through utility(s) (Q2) is then fed to cooling rate determiner 412.

The cooling rate determiner 412 is configured to determine whether the actual instantaneous cooling rate required (Q1) is equal to desired cooling rate through utility(s) (Q2). If the actual instantaneous cooling rate required (Q1) is equal to desired cooling rate through utility(s) (Q2), then Q1 and Q2 are fed to the desired utility flow $F_r$ generator 422.

Alternatively, if the actual instantaneous cooling rate required (Q1) is not equal to desired cooling rate through utility(s) (Q2), this is an indication of process disturbance. In this case, flow of utility is adjusted first, and next new utility is brought in.

The desired utility flow $F_r$ generator 422 is configured for computing desired utility flow $F_r$ for the operating reactor unit 102 based on the computed actual instantaneous cooling rate required Q1, the desired cooling rate Q2, the process dynamics, a Logarithmic Mean Temperature Difference (LMTD) value, a pinch temperature value and Reynold number analysis. The information related to the process dynamics is provided by the parameter handler module 414.

The parameter handler module 414 determines information related to the process disturbances and process dynamics associated with the crystallization process. The information related to process disturbances and process dynamics comprises a) super saturation is subset of temperature, b) temperature is subset of heat transfer, c) heat transfer is subset of enthalpy change *(closed system with constant pressure), d) enthalpy change is subset of heat removal, e) heat removal is subset of cooling rate, f) cooling rate is subset of utility property, g) utility properties are subset of flow of utility, h) flow of utility is subset of position of final control element (also referred as automatic control valve 112A-B), and i) position of final control element (also referred as automatic control valve 112A-B) is subset of heat transfer. This information is then fed to the desired utility flow $F_r$ generator 422 $F_r$ as an input.

Further, the Logarithmic Mean Temperature Difference (LMTD) value is provided by the logarithmic mean temperature difference value generator module 420, The logarithmic mean temperature difference (LMTD) value generator module 420 is configured to calculate the logarithmic mean temperature difference (LMTD) value. The LMTD value generator module 420 is configured for determining logarithmic mean temperature difference between a) initial crystallization mass temperature and utility jacket outlet 126B temperature. Further, the LMTD value generator module 420 is also configured for determining logarithmic mean temperature difference between b) crystallization mass temperature and utility jacket inlet 126A temperature. Specifically, temperature profiles for both hot and cold streams, even in an ideal case of perfect co-current and counter-current exchangers, are not straight lines but are curved lines with exponential type equations. The temperature difference can therefore vary across the length and also would not be linear in nature. The LMTD value is vital to be accounted for because the difference between the hot and cold fluids does not remain same throughout the length of the heat exchanger. Thus, a mean difference of temperature value throughout the length is considered. Such temperature value is responsible for the cooling of the hot fluid and heating of the cold fluid. Logarithmic Mean temperature Difference value is logarithmic average of the temperature difference between hot and cold media at each temperature end. The larger is LMTD value, more is the heat transferred. The LMTD value is calculated by logarithmic temperature difference of two terminal decimal points. The LMTD value in this case is temperature difference between the initial crystallization mass temperature and the utility jacket outlet 126B temperature as well as temperature difference between the crystallization mass temperature and the utility jacket inlet 126A temperature. The LMTD value affects the desired utility flow as the LMTD value is driving factor for heat transfer.

Furthermore, the pinch temperature value is provided by the pinch analysis module 416. The pinch analysis module 416 is configured for generating a pinch curve depicting a temperature difference between instantaneous crystallization mass temperature and utility jacket outlet 126B temperature. The pinch curve considers four temperature values comprising the utility jacket inlet 126A temperature, the utility jacket outlet 126B temperature, the initial crystallization mass temperature, and the instantaneous crystallization mass temperature. The pinch curve is generated to monitor the progress of these temperature values. The difference in temperature values between the instantaneous crystallization mass temperatures and the utility jacket outlet 126B temperature is tracked through the pinch curve. In general, pinch analysis is a methodology for minimizing energy consumption of chemical processes by calculating thermodynamically feasible energy targets (or minimum energy consumption) and achieving them by optimizing heat recovery systems, energy supply methods and process operating conditions. It is also known as process integration, heat integration, energy integration or pinch technology. In heat exchanger, neither the hot stream is cooled below cold stream inlet temperature nor cold stream are heated more than hot stream initial temperature. In practice, hot streams are only cooled to a temperature defined by minimum allowable temperature difference defined by "approach temperature" of heat exchanger. During cooling, the temperature difference between the crystallization mass instantaneous temperature and the utility jacket inlet temperature reduce and reaches a point where the temperatures shall not be reduced further. This is because the temperature difference becomes too small to drive the heat transfer process, even after increasing the flow of utility to maximum level. This can be studied over "temperature-enthalpy diagram". Such minimum temperature indicates pinch or approach temperature. On the other hand, enthalpy is thermodynamic property and defined as total heat content of a process control plant 100. Enthalpy is equivalent to internal energy plus the product of pressure and volume of the process control plant 100. H=U+pv. As per the first law of thermodynamics, $$AU=AQ-AW \qquad \text{equation (1)}$$

and where U is total internal energy. Q is heat added or removed and W is work done.

For processes under constant pressure—"closed system", the enthalpy value equals to change in the internal energy of the process control plant plus pressure-volume work that the process control plant 100 has done on its surroundings. This means that enthalpy under such conditions is change in internal energy due heat absorbed or released by the material through chemical process or by external heat transfer.

$$H=U+pv \qquad \text{equation (2)}$$

With the above data, a pinch temperature value is computed.

Further, the pinch analysis module 416 is configured for determining whether the temperature difference computed is dropped below a predefined threshold value. The predefined threshold value is defined either by the control system 116 automatically or by an operator manually.

Furthermore, the pinch analysis module 416 is configured for identifying the pinch temperature value corresponding to the determined temperature difference which is dropped below the predefined threshold value.

Further, a Reynold number analysis module 418 is configured for monitoring velocity and controlling heat transfer with given utility.

In an embodiment, the desired utility flow $F_r$ for the operating reactor unit 102 is also computed based on utility temperature and flow point at which it should be admitted into jacket. The utility temperature is selected based on the first set of parameters.

Figure 5:
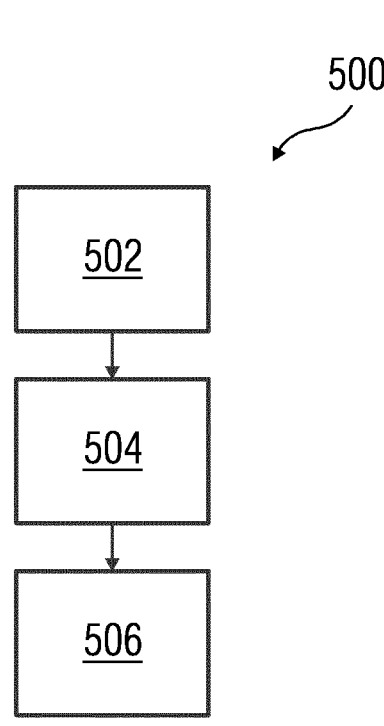
FIG. 5 shows a process flowchart illustrating a detailed method of managing crystallization process in process plant, according to an embodiment of the present disclosure.

FIG. 5 is a process flowchart illustrating a detailed method 500 of managing crystallization process in process plant 100, according to an embodiment of the present disclosure. At step 502, process parameters of an operating reactor unit 102 in a process plant 100 is captured. The process parameters are captured via one or more sensing unit 104A-B, 106, 110. The one or more sensing unit 104A-B, 106, 110 comprises one or more temperature sensors 104A-B external to the operating reactor unit 102 for measuring utility jacket inlet 126A temperature and jacket outlet 126B temperature, one or more temperature sensor 106 deployed internal to the operating reactor unit 102 for measuring crystallization mass temperature, one or more flow meters 110 for measuring utility flow rate, a small positioner 114A-B with an automatic control valve 112A-B for positioning a control element and controlling flow of utility into the operating reactor unit 102. The process parameters comprises cooling rate, utility management, super saturation, temperature of the operating reactor unit, properties of utilities, parameters related to utility flow management, smart positioner properties, and the like and wherein the utility flow management comprises managing desired utility at desired temperature, at desired time, and at desired flow.

At step 504, desired process parameters are predicted based on first set of parameters and the captured process parameters. The first set of parameters comprises information related to process dynamics and process disturbances associated with the operating reactor unit 102. At step 506, process control loop associated with the operating reactor unit 102 is controlled based on the desired process parameters and the first set of parameters.

Figure 6:
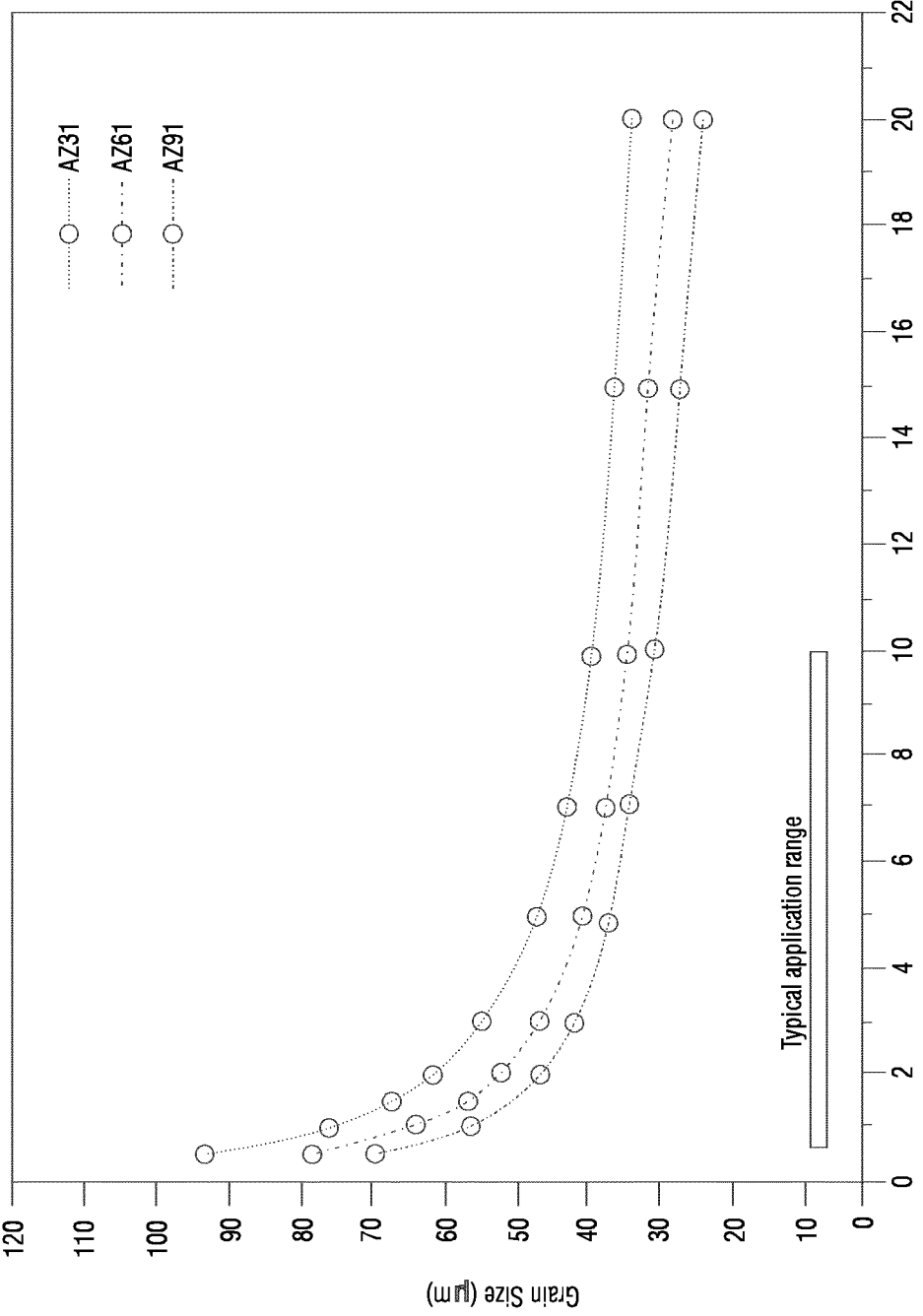
FIG. 6 shows a graphical representation of a process parameter, according to an embodiment of the present disclosure.

FIG. 6 is a graphical representation of a process parameter, according to an embodiment of the present disclosure. In FIG. 6, graphical representation of cooling rate [Kls] versus grain size is depicted. It is to be noted that such graphical representation may not be limited to parameters depicted but includes other parameters relevant in crystallization process. FIG. 6 depicts crystal growth-related parameters affecting the crystallization process. For example, particle size distribution spectrum results in losses of the fines in filter or adding to milling operation. Rapid cooling produces small crystals, slower produces larger crystals as depicted in FIG. 6.

Figure 7:
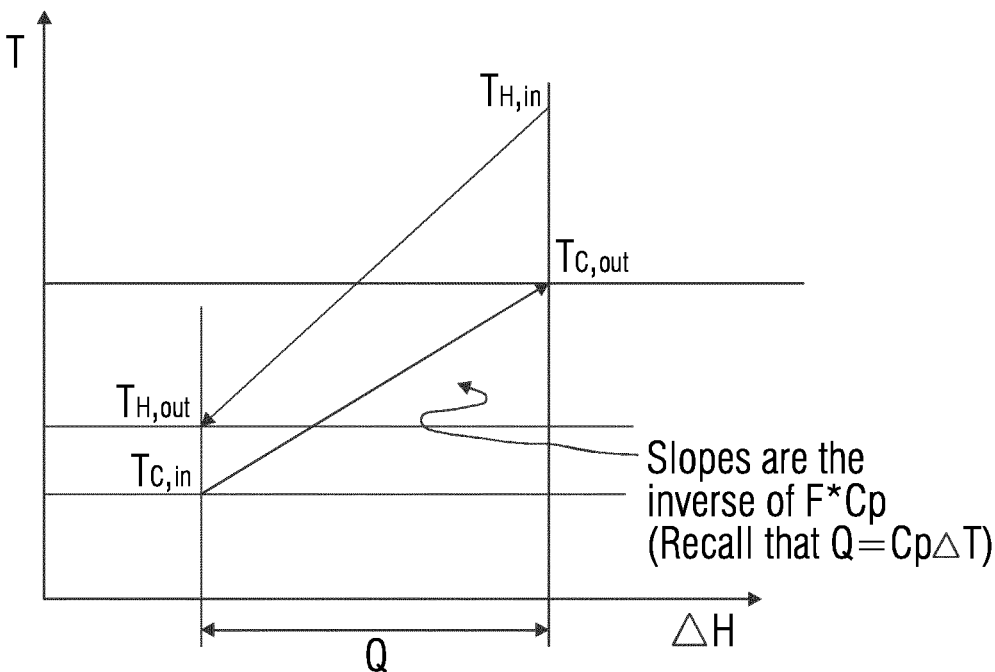
FIG. 7 shows a graphical representation of a utility flow curve depicting utility flow management of the process control plant, according to an embodiment of the present disclosure.
Figure 8:
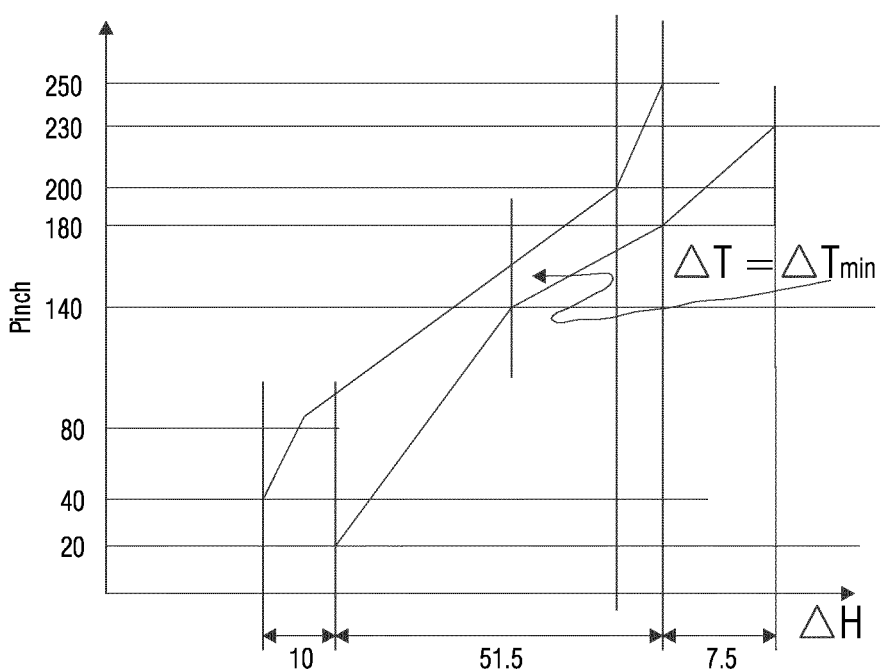
FIG. 8 shows a graphical representation depicting an exemplary pinch analysis method, according to an embodiment of the present disclosure.

FIG. 7 is a graphical representation of a utility flow curve 700 depicting utility flow management of the process control plant 100, according to an embodiment of the present disclosure. FIG. 7 depicts cooling rate slope versus time factor. The cooling rate slopes are inverse of actual flow of utility (F) multiplied with specific heat of utility being used (Cp)(given that Q=F Cp ΔT), FIG. 8 is a graphical representation depicting an exemplary pinch analysis method 800, according to an embodiment of the present disclosure. FIG. 8 depicts a pinch diagram which is monitored and controlled by the pinch analysis module 416. The pinch I is defined either as the cold temperature (140° C.), or as corresponding hot temperature (140° C.+ΔT 150° C.) or as average (145° C.). It is observed from FIG. 8 that the pinch is at the beginning of a cold stream or at the beginning of a hot stream.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for crystallization cooling control in a process plant, the method comprising:
   capturing process parameters of an operating reactor unit in a process plant, wherein the process parameters are captured via one or more sensing unit;
   predicting desired process parameters based on first set of parameters and the captured process parameters, wherein the first set of parameters comprises information related to process dynamics and process disturbances associated with the operating reactor unit, where the step of predicting the desired process parameters further comprises:

determining actual flow of utility into the operating reactor unit based on the captured process parameters; comparing the desired utility flow for the operating reactor unit with the actual flow of utility to determine a utility flow error value;

generating a control signal indicating a change of position of a smart positioner associated with the operating reactor unit based on the utility flow error value;

determining current position of the smart positioner using the captured process parameters;

transmitting the generated control signal to the smart positioner via a control system;

determining hysteresis value associated with the smart positioner; and repositioning the smart positioner based on the transmitted control signal, wherein the repositioning of the smart positioner rectifies the utility flow error value to zero value; and controlling process control loop associated with the operating reactor unit based on the desired process parameters, the first set of parameters and the utility flow error;

wherein the process parameters comprise cooling rate, super saturation, temperature of the operating reactor unit, properties of utilities, parameters related to utility flow management, smart positioner properties, and the like and wherein the utility flow management comprises managing desired utility at desired temperature, at desired time, and at desired flow.

2. The method according to claim 1, wherein the one or more sensing unit comprises one or more temperature sensors external to the operating reactor unit for measuring utility jacket inlet temperature and jacket outlet temperature, one or more temperature sensor deployed internal to the operating reactor unit for measuring crystallization mass temperature, one or more flow meters for measuring utility flow rate, a smart positioner with an automatic control valve for positioning a control element and controlling flow of utility into the operating reactor unit.

3. The method according to claim 1, wherein predicting the desired process parameters based on the first set of parameters and the captured process parameters comprises:

computing actual instantaneous cooling rate required for the operating reactor unit based on a second set of parameters associated with the operating reactor unit, wherein the second set of parameters comprises crystallization mass, specific heat of crystallization mass, initial crystallization mass temperature, final crystallization mass temperature, initial batch time, final batch time, instantaneous crystallization mass temperature, instantaneous batch time, and time lapsed versus actual step change time;

computing desired cooling rate through utility(s) based on the actual instantaneous cooling rate required and based on a third set of parameters, wherein the third set of parameters comprises actual flow of utility and specific heat of utility being used in the operating reactor unit; and computing desired utility flow for the operating reactor unit based on the computed actual instantaneous cooling rate required, the desired cooling rate, the process dynamics, a Logarithmic Mean Temperature Difference value, a pinch temperature value and Reynold number analysis.

4. The method according to claim 3, wherein computing the actual instantaneous cooling rate required for the operating reactor unit based on the second set of parameters associated with the operating reactor unit comprises:

determining second set of parameters associated with the operating reactor unit using the one or more sensing unit.

5. The method according to claim 3, wherein computing the desired cooling rate through the utility(s) based on the actual instantaneous cooling rate required and based on the third set of parameters comprises:

determining the third set of parameters associated with the operating reactor unit.

6. The method according to claim 3, wherein the pinch temperature value is computed by:

generating a pinch curve depicting a temperature difference between instantaneous crystallization mass temperature and utility jacket outlet temperature;

determining whether the temperature difference is dropped below a predefined threshold value; and identifying the pinch temperature value corresponding to the determined temperature difference which is dropped below the predefined threshold value.

7. The method according to claim 3, wherein the logarithmic mean temperature difference value is computed by:

determining logarithmic mean temperature difference between a) initial crystallization mass temperature and utility jacket outlet temperature, and b) crystallization mass temperature and utility jacket inlet temperature.

8. The method according to claim 1, wherein predicting the desired process parameters based on the first set of parameters and the captured process parameters comprises:

determining flow of subsequent utility into the operating reactor unit based on the actual instantaneous cooling rate required when purging is complete, instantaneous crystallization mass temperature and the logarithmic mean temperature difference value.

9. The method according to claim 1, wherein controlling the process control loop associated with the operating reactor unit based on the desired process parameters and the first set of parameters comprises:

determining loop control mode of selection of a control system, wherein the loop control mode of selection comprises at least one of a Proportional, Integral, Derivative mode or an auto mode;

determining desired cooling rate slope of the operating reactor unit based on pinch temperature and time factor, if the loop control mode of selection is in auto mode;

comparing the determined desired cooling rate slope with actual cooling rate slope; and controlling the process control loop associated with the operating reactor unit based on the comparison.

10. A process plant comprising:

one or more operating reactor unit comprising:

an enclosure capable of yielding a solid product from a solution through a crystallization process, wherein the enclosure comprises:

a crystallization mass; and wherein:

a mass temperature sensor for measuring temperature of the crystallization mass;

one or more external temperature sensors for measuring utility jacket inlet and outlet temperature and steam inlet temperature;

one or more flow meters for measuring one or more utility flow rate with respect to the one or more operating reactor unit and measuring steam flow rate;

one or more automatic control valves comprising a smart positioner for positioning a control element and controlling flow of utility into the one or more operating reactor unit; and a control system coupled to the one or more automatic control valves, one or more flow meters, the mass temperature sensor and the one or more external temperature sensors, wherein the control system is programmed to:

capture process parameters of the one or more operating reactor unit, wherein the process parameters are captured via the one or more flow meters, the mass temperature sensor and the one or more external temperature sensors;

predict desired process parameters based on first set of parameters and the captured process parameters, wherein the first set of parameters comprises information related to process dynamics and process disturbances associated with the one or more operating reactor unit, where the step of predicting the desired process parameters further comprises: determining actual flow of utility into the operating reactor unit based on the captured process parameters; comparing the desired utility flow for the operating reactor unit with the actual flow of utility to determine a utility flow error value; generating a control signal indicating a change of position of a smart positioner associated with the operating reactor unit based on the utility flow error value; determining current position of the smart positioner using the captured process parameters; transmitting the generated control signal to the smart positioner via a control system;

determine hysteresis value associated with the smart positioner; and repositioning the smart positioner based on the transmitted control signal, wherein the repositioning of the smart positioner rectifies the utility flow error value to zero value; and control process control loop associated with the one or more operating reactor unit based on the desired process parameters, the first set of parameters, and the utility flow error;

wherein the process parameters comprise cooling rate, super saturation, temperature of the operating reactor unit, properties of utilities, parameters related to utility flow management, smart positioner properties, and the like and wherein the utility flow management comprises managing desired utility at desired temperature, at desired time, and at desired flow.

11. The process plant according to claim 10, wherein the control system comprises:

a control unit for monitoring and controlling the process control loop associated with the one or more operating reactor unit; and a remote input/output box for transmitting control signals to the one or more flow meters, the mass temperature sensor and the one or more external temperature sensors.

12. The process plant according to claim 10, wherein the control system is capable of periodically monitoring the process control loop associated with the one or more operating reactor unit.

13. A control unit comprising:

a processor; and a memory coupled to the processor, wherein the memory comprises a process control module stored in the form of machine-readable instructions and executable by the processor, wherein that the process control module is programmed to:

capture process parameters of an operating reactor unit in a process plant, wherein the process parameters are captured via one or more sensing unit;

predict desired process parameters based on first set of parameters and the captured process parameters, wherein the first set of parameters comprises information related to process dynamics and process disturbances associated with the operating reactor unit, where the step of predicting the desired process parameters further comprises:

determining actual flow of utility into the operating reactor unit based on the captured process parameters;

comparing the desired utility flow for the operating reactor unit with the actual flow of utility to determine a utility flow error value;

generating a control signal indicating a change of position of a smart positioner associated with the operating reactor unit based on the utility flow error value;

determining current position of the smart positioner using the captured process parameters;

transmitting the generated control signal to the smart positioner via a control system; determining hysteresis value associated with the smart positioner; and repositioning the smart positioner based on the transmitted control signal, wherein the repositioning of the smart positioner rectifies the utility flow error value to zero value; and control process control loop associated with the operating reactor unit based on the desired process parameters, the first set of parameters and the utility error;

wherein the process parameters comprise cooling rate, super saturation, temperature of the operating reactor unit, properties of utilities, parameters related to utility flow management, smart positioner properties, and the like and wherein the utility flow management comprises managing desired utility at desired temperature, at desired time, and at desired flow.

14. The control unit according to claim 13, wherein the process control module is capable of:

storing the captured process parameters, desired critical parameters, first set of parameters, second set of parameters, and third set of parameters.

* * * * *